US012760773B2

(12) United States Patent
Shahin

(10) Patent No.: US 12,760,773 B2
(45) Date of Patent: Oct. 13, 2026

(54) SELF-LUBRICATING BRAKE COMPONENT ASSEMBLY FOR A VEHICLE WHEEL BRAKE

(71) Applicant: HL MANDO CORPORATION, Pyeongtaek (KR)

(72) Inventor: Hatem Shahin, Pfaffenhofen (DE)

(73) Assignee: HL MANDO CORPORATION, Pyeongtaek (KR)

( * ) Notice: Subject to any disclaimer, the term of this patent is extended or adjusted under 35 U.S.C. 154(b) by 350 days.

(21) Appl. No.: 18/420,880

(22) Filed: Jan. 24, 2024

(65) Prior Publication Data

US 2024/0369113 A1 Nov. 7, 2024

(51) Int. Cl.

*F16D 65/00* (2006.01)
*F16D 65/095* (2006.01)
*F16D 65/18* (2006.01)

(52) U.S. Cl.

CPC ..... *F16D 65/0006* (2013.01); *F16D 65/0068* (2013.01); *F16D 65/0087* (2013.01); *F16D 65/095* (2013.01); *F16D 65/18* (2013.01)

(58) Field of Classification Search

CPC ............. F16D 65/0006; F16D 65/0068; F16D 65/0087; F16D 65/18; F16D 65/095; F16D 55/22655

See application file for complete search history.

(56) References Cited

U.S. PATENT DOCUMENTS 4,143,204 A * 3/1979 Fang ........................ B05D 5/08 427/388.5
5,438,806 A * 8/1995 Reinhall ............... E04B 1/8409 52/167.1
5,549,394 A * 8/1996 Nowak ................. B29C 70/745 384/275
5,664,890 A * 9/1997 Nowak ................. B29C 70/745 384/275
5,727,659 A * 3/1998 Brown ................ F16D 55/2262 188/73.36
6,095,690 A * 8/2000 Niegel .................. F16C 33/046 384/293
6,213,257 B1 * 4/2001 Yano .................. F16D 65/0971 188/73.37

(Continued)

FOREIGN PATENT DOCUMENTS

DE 2811848 A1 9/1978
DE 102006053183 A1 5/2008

(Continued)

OTHER PUBLICATIONS

DE OA.

*Primary Examiner* — Henry Y Liu
(74) *Attorney, Agent, or Firm* — Harvest IP Law, LLP

(57) ABSTRACT

Disclosed is a brake component assembly for a vehicle wheel brake, comprising a first component and a second component, wherein the first and second component are movable relative to one another for engaging and releasing the vehicle wheel brake, wherein a self-lubricating material is provided that is configured to lubricate at least one pair of surfaces that contact one another and that are movable relative to one another when moving the first and second component relative to one another, wherein the self-lubricating material is elastically deformable.

12 Claims, 6 Drawing Sheets

(56) References Cited

U.S. PATENT DOCUMENTS

| | | | | | |
|---|---|---|---|---|---|
| 6,286,636 | B1* | 9/2001 | Iwata | F16D 65/0978 188/73.31 |
| 6,527,090 | B1* | 3/2003 | Barillot | F16D 65/0972 188/73.1 |
| 7,152,717 | B2* | 12/2006 | Lelievre | F16D 65/0972 188/250 F |
| 7,318,503 | B2* | 1/2008 | Farooq | F16D 65/0974 188/73.31 |
| 8,314,053 | B2* | 11/2012 | Jensen | F16C 33/14 508/108 |
| 8,496,381 | B2* | 7/2013 | Hunter | C10M 169/02 384/276 |
| 8,679,400 | B2* | 3/2014 | Takayama | F16C 33/14 508/105 |
| 9,109,651 | B2* | 8/2015 | Peters | F16D 65/0006 |
| 9,657,776 | B2* | 5/2017 | Hunter | C10M 169/02 |
| 9,689,445 | B2* | 6/2017 | Merrien | F16D 65/0972 |
| 9,982,715 | B2* | 5/2018 | Gorges | F16C 33/1045 |
| 10,415,660 | B2* | 9/2019 | Barbosa | F16D 55/2265 |
| 10,451,111 | B2* | 10/2019 | Karaki | C08K 7/14 |
| 10,774,889 | B2* | 9/2020 | Baek | F16D 65/0972 |
| 10,890,220 | B2* | 1/2021 | Merlo | F16D 55/22 |
| 11,746,842 | B2* | 9/2023 | Baek | F16D 55/227 188/72.3 |
| 12,352,326 | B2* | 7/2025 | Yoon | F16D 65/0068 |
| 2002/0155304 | A1* | 10/2002 | Tanaka | C08L 79/04 384/909 |
| 2003/0185474 | A1* | 10/2003 | Tanaka | B32B 27/00 384/297 |
| 2007/0009757 | A1* | 1/2007 | Takayama | F16C 33/12 428/617 |
| 2008/0146467 | A1* | 6/2008 | Takayama | F16C 33/121 508/105 |
| 2009/0257694 | A1* | 10/2009 | Hunter | F16C 33/10 384/286 |
| 2010/0133050 | A1* | 6/2010 | Arbesman | F16D 65/0971 188/73.35 |
| 2011/0120821 | A1* | 5/2011 | Shimamura | F16D 65/0972 188/234 |
| 2011/0317955 | A1* | 12/2011 | Mayston | F16C 33/206 524/514 |
| 2012/0177528 | A1* | 7/2012 | Takayama | E02F 9/006 228/199 |
| 2013/0108195 | A1* | 5/2013 | Sun | C10M 169/044 264/134 |
| 2013/0192938 | A1* | 8/2013 | Miller | F16D 65/0006 188/73.31 |
| 2013/0244039 | A1* | 9/2013 | Peters | F16D 65/0972 427/372.2 |
| 2014/0003749 | A1* | 1/2014 | Hunter | C10M 119/02 384/291 |
| 2015/0051123 | A1* | 2/2015 | Karaki | C10M 107/42 427/520 |
| 2016/0084308 | A1* | 3/2016 | Gorges | F16C 33/208 508/105 |
| 2016/0160920 | A1* | 6/2016 | Karaki | C10M 107/44 508/106 |
| 2017/0081522 | A1* | 3/2017 | Adam | C09D 7/61 |
| 2018/0216680 | A1* | 8/2018 | Merlo | B62L 1/005 |
| 2020/0040953 | A1* | 2/2020 | Baek | F16D 65/0972 |

FOREIGN PATENT DOCUMENTS

| | | | |
|---|---|---|---|
| DE | 102014213410 | A1 | 1/2016 |
| DE | 102016104351 | A1 | 9/2017 |
| FR | 2921136 | A1 | 3/2009 |
| JP | S5783732 | A | 5/1982 |
| JP | H0694057 | A | 4/1994 |
| JP | H09-291953 | A | 11/1997 |
| JP | 2007010056 | A | 1/2007 |
| KR | 10-2017-0019657 | A | 2/2017 |

* cited by examiner

SELF-LUBRICATING BRAKE COMPONENT ASSEMBLY FOR A VEHICLE WHEEL BRAKE

CROSS-REFERENCE TO RELATED APPLICATION

This application is based on and claims priority under 35 U.S.C. § 119 to German Patent Application No. 102023111503.0, filed on May 3, 2023 in the German Patent and Trade Mark Office, the disclosures of which are incorporated herein by reference.

BACKGROUND

1. Field

The invention relates to a brake component assembly for a vehicle wheel brake. In particular, a brake component assembly for a vehicle wheel brake that is configured as a disc brake is disclosed. The vehicle may be a road vehicle, such as car, a truck or a bus.

2. Description of the Related Art

Vehicle wheel brakes are typically provided to brake individual wheels of a vehicle. They comprise a plurality of components, in particular components that are movable relative to one another. In case these components contact one another or at least indirectly support one another during their relative movement, forces may be transmitted between these components. This may result in vibrations and in acoustic noises being generated. These noises may in particular occur in form of squeal noises in a frequency range between 1000 Hz and 16000 Hz.

Several attempts have been made to adapt vehicle wheel brakes and in particular their moving components to limit the generation of such noises. Typically, these attempts focus on noise-generating effects occurring during braking as well as at the beginning of a braking operation (e.g. when displacing a brake pad towards a brake disc).

Typical approaches to suppress noise generation include providing a shim on a back plate of a brake pad as e.g. disclosed in DE 10 2014 213 410 A1. Moreover, it is known to provide chamfers on contact surfaces of brake pads contacting a brake disc, slots within such contact surfaces as well as modifications of a friction material or underlayer material used in brake pads.

It has been observed that such existing solutions are insufficient to reliably suppress acoustic noises when operating a vehicle wheel brake.

SUMMARY

Accordingly, it is an object of this invention to improve operating characteristics of a vehicle wheel brake, in particular with respect to a generation of vibrations and an associated generation of acoustic noise.

This object is solved by the subject matter according to the attached independent claim. Advantageous embodiments are set out in the dependent claims, in this description and in the figures.

Accordingly, a brake component assembly for a vehicle wheel brake is suggested, the brake component assembly comprising a first component and a second component, wherein the first and second component are movable relative to one another when engaging and releasing the vehicle wheel brake. A self-lubricating material is provided that is configured to lubricate at least one pair of surfaces that (e.g. slidingly) contact one another and that are movable relative to one another when moving the first and second component relative to one another. The self-lubricating material is elastically deformable, e.g. by contact forces occurring between (or forces transmitted in between) the first component and second component, e.g. when operating the vehicle wheel brake. That is, the self-lubricating material may elastically deform under normal operating conditions, e.g. when engaging and/or releasing the brake pad.

The brake component assembly may comprise any further and in particular all further components for forming an entire vehicle wheel brake. This may e.g. include any and in particular all of: a brake caliper housing, a brake pad carrier, a brake disc and at least one brake pad.

The surfaces of the pair of surfaces may be comprised by the first and second component (e.g. a first surface of said pair by the first component and a second surface of said pair by the second component). Alternatively, at least one of the surfaces of the pair of surfaces may be comprised by an additional component (e.g. a third component of the brake component assembly and/or a clip discussed below). Said additional component may e.g. be arranged in between the first and second component. For example, said additional component may contact or support at least one of the first and second component and/or transmit forces between the first and second component. According to below discussed embodiments, said additional component may be a clip that is e.g. held at one of the first and second component and is movable relative to the respective other one of the first and second component.

The self-lubrication may include that a lubricant (e.g. a lubricating film) is provided at and/or by the lubricating material when operating the vehicle wheel brake. This lubricating film may be upheld and/or frequently renewed by the self-lubricating material over an operating life of several months or years. For example, the self-lubrication may include that the self-lubricating material produces and/or discharges a lubricating film during operation of the brake component assembly. For example, the self-lubricating material may comprise an intrinsic self-lubrication effect (e.g. an intrinsic capability to produce the lubricating film discussed above).

On the other hand, it may not be necessary (and may generally not be part of the self-lubrication disclosed herein) to provide a lubricant deposits or lubricant reservoirs at external component surfaces. In the prior art, such lubricant deposits may e.g. be disposed in form of grease or oil deposits having large volumes. At least according to embodiments of this disclosure, the self-lubricating material may rather be a stiff and/or non-fluid material. Over a long operating life (e.g. steadily and/or little by little) the self-lubricating material may exude, release or discharge a lubricant film, without necessarily requiring external lubricant deposits directly add its surfaces. Nonetheless, the presently disclosed solution may be provided in combination with such external lubricant deposits.

To sum up, the self-lubricating material may inherently comprise an e.g. integrated lubricant that is releasable over time, instead of an external lubricant disposed on one of its external surfaces.

Optionally, the self-lubricating material may comprise a degradable matrix or a degradable base material including lubricating particles (e.g. spatially dispersed lubricant particles). The latter, when exposed, may produce the lubricating film. Additionally or alternatively, the self-lubricating material may e.g. under mechanical pressure release a lubricant to produce the lubricant film. For example, the self-lubricating material may be a rubber material (or another elastically deformable material, in particular an elastomeric material) exuding (and in particular steadily renewing) a lubricating film over time. One example of such a self-lubricating materials are self-lubricating silicones, such as liquid silicone rubbers in which optionally a lubricant may be injected. Other examples of self-lubricating materials include self-lubricating plastics, such as UHMW-PE (ultra high molecular weight polyethylene) with oil or wax added; Nylon with solid oil, wax or molybdenum added; Teflon with molybdenum added.

It has been observed that by way of the solution disclosed herein, vibrations and acoustic noises can significantly be reduced. This applies to the start of a braking process, e.g. when a displacement of a brake pad (as one example of the first component) relative to a brake pad carrier (as one example of the second component) sets in, as well as during braking. Yet, as an advantage over prior art solutions, the present solution may also help to reduce vibrations and acoustic noises when displacing the brake pad in the opposite direction after braking, that is when releasing the vehicle wheel brake. Specifically, it has been observed that during this releasing displacement, uncontrolled relative movements and in particular tilting movements may occur between causing vibrations and acoustic noises. Specifically, flutter vibrations may occur when releasing the brake. The present solution helps to suppress such flutter vibrations. Additionally or alternatively, it may at least somewhat dampen unintended contact forces between the components when releasing the brake due to the disclosed self-lubricating effect and elastic deformability.

According to one embodiment, the self-lubricating material is comprised by a coating arranged at least one of the surfaces of the pair of surfaces. For example, the coating may be applied to the component during production and before arranging the component in the brake component assembly. The coating may directly be provided at the respective component and cover part of an external surface thereof. The coating may thus form an integral and/or non-removable part of the respective component. Providing the self-lubricating material as a coating may help to reduce overall part numbers and production costs. Also, it reliably positions the self-lubricating material directly at one of the components, so that relative movements between the self-lubricating material and this component are prevented.

In one example, the self-lubricating material is comprised by at least one clip that comprises one of the surfaces of the pair of surfaces and that is held at one of the first component and second component. The clip may be separately produced, i.e. may be separate from the respective one of the first and second component. The clip may e.g. be fixed to the respective one of the first and second component at which it is held. The fixation may include a mechanical fixation, e.g. by means of mechanical fixing elements, such as rivets or screws. Additionally or alternatively, the fixation may include a force fit (e.g. by elastically clamping the clip to the respective one of the first and second component) and/or a fixation based on an adhesive connection formed between the clip and the component.

The clip may have a first surface facing the first component and a second surface facing the second component. At least one of said first and second surfaces may form a surface of a pair of surfaces discussed above.

By providing the self-lubricating material at a separate clip, changes to existent component designs can be limited. Also, the clip can be independently replaced to restore a self-lubricating effect.

According to one embodiment, one of the first component and second component is a brake pad and the clip is arranged at the brake pad and is jointly displaceable therewith. For example, the brake pad may have at least one guiding projection that is receivable in a guiding recess of a brake pad carrier. The guiding projection may also be referred to as a guiding ear. It may be provided at a lateral surface of the brake pad. It may e.g. project in a plane extending in parallel to a contact surface of the brake pad contacting a brake disc. The clip may be arranged at such a guiding projection. In particular, it may at least partially surround the guiding projection and/or receive at least part of said guiding projection.

In one example, the clip has C-shape, in particular wherein the C-shape may be angled (e.g. have sharp corners) or curved. At least part of the brake pad and in particular of its optional guiding projection may be arranged within a recess formed by said C-shape.

The clip may act as a known pad clip helping to limit vibrations between the brake pad and brake pad carrier. Additionally or alternatively, the clip may act as a pad spring and also provide a brake pad restoring effect. Specifically, when configured as a pad spring, the clip may be configured to generate a restoring force for displacing the brake pad back into its original position when releasing the brake. This may be achieved by the clip having at least one deformable section that elastically deforms in accordance with a displacement of the brake pad towards a brake disc. This elastic deformation may generate a restoring force for lifting the brake pad off of the brake disc after braking.

Additionally or alternatively, the clip comprising the self-lubricating material may be provided in addition to a known pad clip or known pad spring. For example, the clip disclosed herein may be received in such a known pad clip or pad spring together with a section of the brake pad at which it is arranged.

According to a further embodiment, one of the first component and second component is a brake pad carrier and the clip is arranged at the brake pad carrier. The brake pad carrier may generally be configured to carry and/or guide at least one brake pad, e.g. during its displacement towards and away from a brake disc of the vehicle wheel brake. For example, the brake pad carrier may comprise a guiding groove in which a guiding projection as discussed above is received. The brake pad carrier may be stationary, e.g. due to being fixed to an axle component, such as an axle knuckle. A brake caliper housing may move relative to the brake pad carrier while displacing at least one brake pad.

When arranged at the brake pad carrier, the clip may, for example, at least partially be received in a guiding groove thereof. Generally, the clip may be arranged so as to be able to contact and in particular receive at least a section of the brake pad, e.g. of its guiding projection. Again, the clip may be C-shaped. A closed side of said C-shape may face the brake pad carrier, whereas an open side thereof may face the brake pad, in particular to receive at least part of the latter.

Arranging the clip at any of the brake pad and brake pad carrier reliably suppresses and vibrations and acoustic noises. In one example, both of the brake pad and brake pad carrier comprise a respective clip. In this case, each clip may comprise one of the surfaces from the pair of surfaces, so that these clips may in particular contact one another.

According to one example, the self-lubricating material is provided at both of the surfaces of the pair of surfaces. For example, both of these surfaces may have a coating comprising the self-lubricating material discussed above. Alternatively, at least one of the surfaces may comprise a clip (as e.g. discussed above) comprising the self-lubricating material. By providing both surfaces with the self-lubricating material, acoustic noises and vibrations are suppressed particularly reliably.

According to a further example, the self-lubricating material is arranged at at least one perforated member. The perforation may include at least two through-holes formed in the member and preferably more than five through-holes or more than ten through-holes. A spatial distribution of the perforation (i.e. of its through-holes) may be regular to e.g. generate a spatially uniform lubrication. Yet, it may also be irregular, e.g. to locally increase lubrication.

A material of the perforated member may be different from the self-lubricating material. In particular, this material may be stiffer than the self-lubricating material and/or may not be elastically deformable when operating the wheel brake. In one example, the perforated member comprises and/or contacts at least one of the surfaces of the pair of surfaces.

The perforated member may act as a cover or shield for the self-lubricating material. Accordingly, it may limit or even prevent a direct contact of the self-lubricating material with a surface of the pair of surfaces that are to be lubricated. This may help to suppress mechanical abrasion of the self-lubricating material. On the other hand, contact forces exerted onto the perforated member may be transmitted by the letter to the self-lubricating material. This may promote a release of lubricant from the self-lubricating material. This lubricant may be released through the perforations of the perforated member, thus reaching the pair of surfaces to be lubricated. In sum, the perforated member may thus protect the self-lubricating material and/or enable a reliable and steady release of lubricant over a long operating life.

The perforated member may e.g. comprise a plastic material or a metal material, such as steel. This may provide a reliable protection and support of the self-lubricating material.

In one example, a clip according to any of the above embodiments may be provided, the clip comprising the perforated member. For example, the perforated member may form a sub-member or at least one layer of the clip. Accordingly, the perforated member may have a C-shape as well. The perforated member may form the stiffest member of (or within) the clip and/or the only member (or layer) that, on its own, is able to maintain a non-planar shape, such as a C-shape.

According to a further example, the self-lubricating material is arranged in between a first perforated member and a second perforated member, e.g. so as to be sandwiched in between them. In particular, the self-lubricating material may be provided at (and in particular in contact with) both of the first and second perforated member. The first and second perforated member may form outer surfaces of a clip and may be configured according to any embodiments disclosed herein. These outer surfaces may face away from one another. For example, each of said outer surfaces may face one of the first and second component. In particular, each of said outer surfaces may form one surface of a pair of surfaces that is to be lubricated.

In one example, the component assembly comprises a first pair of surfaces and a second pair of surfaces, the surfaces of each pair being configured as explained above with respect to the single pair of surfaces (i.e. being in contact with one another and moving relative to one another). At least one self-lubricating material may be provided that is configured to lubricate at least one and preferably both pairs of surfaces. In the latter case, the self-lubricating material may be arranged in between the first and second pair of surfaces. For example, the self-lubricating material may be sandwiched between perforated members as discussed above, in particular perforated members comprised by a clip as disclosed herein. The self-lubricating material may be configured to lubricate outer surfaces of both perforated members, with of the outer surface of each perforated member being comprised by one of the first and second pair of surfaces.

In further examples, one of the following is further provided:

- The first component is a brake piston the second component is a backplate of a brake pad. The backplate may e.g. be a rigid member, in particular a metallic member. It may comprise guiding projections as disclosed herein. It may carry a friction lining that is used for contacting a brake disc of the vehicle wheel brake and e.g. comprises a friction material that is different from a material of the backplate.
- The first component it is a finger portion of a brake caliper housing and the second component is a backplate of a brake pad, in particular a backplate that is contacted by a finger portion. As is known in the prior art, the brake caliper housing may be a floating caliper housing and/or may move relative to a stationary brake pad carrier. It may comprise a receiving section in which a brake piston is received. It may have a piston portion arranged at the same side of the brake disc as the brake piston. The finger side comprising at least one finger portion, on the other hand, may be located on an opposite side of the brake disc.
- The first component is a guide pin and the second component is a brake pad carrier. The guide pin may, in a generally known manner, connect a brake caliper housing and a brake pad carrier. For example, when moving the brake caliper housing relative to the brake pad carrier, guide pins that are fixed to the brake caliper housing may be slidingly supported in the brake pad carrier.

BRIEF DESCRIPTION OF DRAWINGS

Embodiments of the present disclosure are discussed in the following with reference to the attached schematic drawings. Throughout the figures, same or corresponding features may be marked with same reference signs.

DETAILED DESCRIPTION

Figure 1:
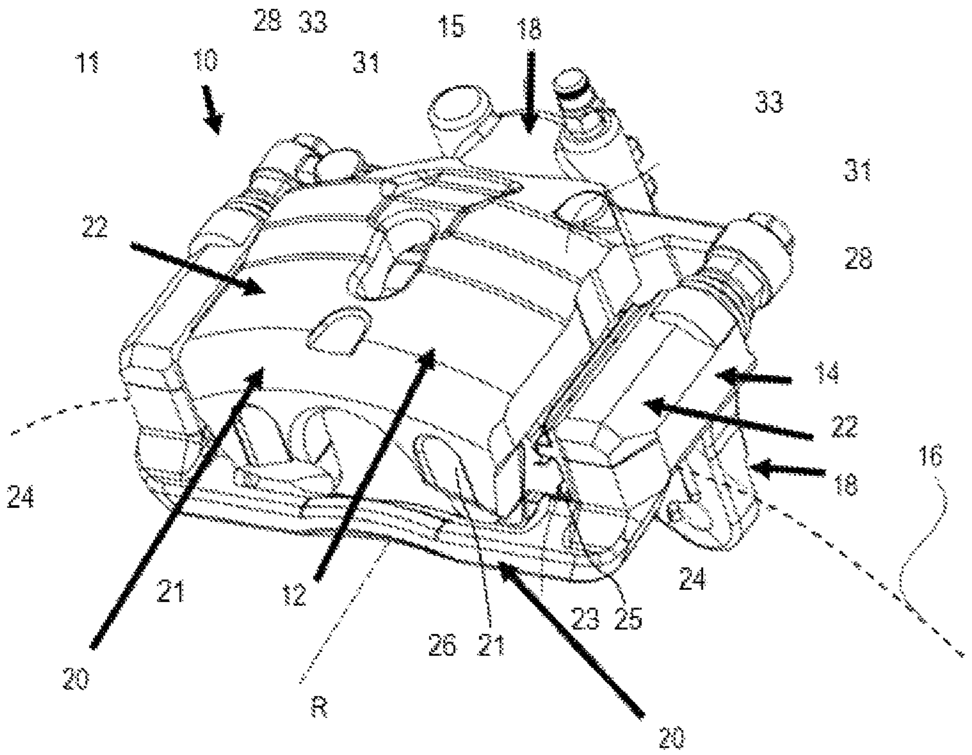
FIG. 1 (prior art)
FIG. 1 shows a vehicle wheel brake according to a prior art example.

FIG. 1 shows a wheel brake assembly 10 in form of a vehicle disc brake 11, the wheel brake assembly 10 being configured according to generally known floating caliper principles. It comprises a brake caliper housing 12 that is slidingly supported by a stationary brake pad carrier 14.

The wheel brake assembly 10 is configured to press brake pads 26 (one of which is partially visible in FIG. 1) against a brake disc 16. The brake pads 26 are received in and guided by the brake pad carrier 14. Only part of an outer circumferential edge of the brake disc 16 is indicated by a dashed line in FIG. 1, the brake disc 16 generally being configured according to known examples. Further, a rotation axis R about which the brake disc 16 rotates is schematically indicated by a dotted line in FIG. 1.

The brake caliper housing 12 comprises a receiving section 15. Only an outer wall of said receiving section 15 is visible in FIG. 1 and the receiving section 15 is formed as an (non-visible) open cylindrical cavity. In said receiving section 15, a non-illustrated brake piston is received.

The brake caliper housing 12 comprises a piston side 18 located at a first side face of the brake disc 16 and specifically at the same side face as the receiving section 15. Further, the brake caliper housing 12 comprises a finger side 20 located at the respective opposite side face of the brake disc 16 compared to the piston side 18. The finger side 20 comprises (merely as an example) two finger portions 21 according to known configurations.

The finger side 20 and the piston side 18 are connected to one another by a bridge section 22. The bridge section 22 overlaps with the outer circumferential surface of brake disc 16 or, put differently, axially spans across the brake disc 16 and/or extends from one of the side faces of said brake disc 16 to the other.

Figure 2:
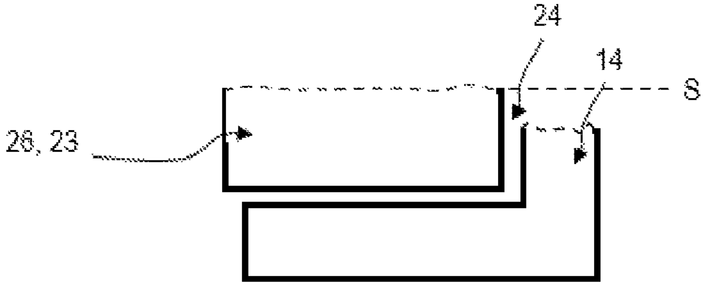
FIG. 2 (prior art)
FIG. 2-4 show states of brake component assemblies when activating the vehicle wheel brake according to FIG. 1.

In a generally known manner, the brake piston received in the receiving section 15 and the inside of the finger portions 21 that face away from the viewer in FIG. 2 are configured to rest against the brake pads 26 and to press them against the brake disc 16.

Just like the brake caliper housing 12, the brake pad carrier 14 comprises a piston side 18, a finger side 20 and a bridge section 22. Guiding grooves 24 of the brake pad carrier 14 are provided at an inner side of the bridge section 22 for slidingly receiving the two brake pads 26, one of said guiding grooves 24 being partially visible in FIG. 1. The brake pads 26 are located on opposite side faces of the brake disc 16. The brake pads 26 are generally identical to one another, but are oriented differently to face the different side faces of the brake disc 16.

Each brake pad 26 comprises guiding projections 23, one of which is visible in FIG. 1. Each guiding projection 23 is received in one of the guiding grooves 24. Pad springs 25 that are configured as bent sheet metal parts are arranged in between each guiding groove 24 and each guiding projection 23, so that the guiding projections 23 do not directly contact the guiding grooves 24, but the pad spring 25 instead.

FIG. 1 also illustrates that the movable brake caliper housing 12 is slidingly supported by and guided relative to the brake pad carrier 14 by means of guide pins 28. These are provided at both of a trailing side and leading side of the wheel brake assembly 10.

According to the configuration of FIG. 1, the guide pins 28 are each received in a non-illustrated cylindrical blind hole in the brake pad carrier 14. An axial length of said blind holes exceeds that of the guide pins 28, so that the latter may axially slide back and forth within the blind holes.

The guide pins 28 are secured to the brake caliper housing 12 by means of a screw connection. Specifically, fixing projections 31 are provided at each of a trailing side and a leading side of the brake caliper housing 12, said fixing projections 31 each comprising a non-visible through-hole. A guide pin 28 is aligned with each of said through holes to engage with a locknut 33 provided at an opposite side of the fixing projections 31. This way, the guide pins 28 are mechanically fixed to the fixing projections 31 and thus to the brake caliper housing 12.

Figure 3:
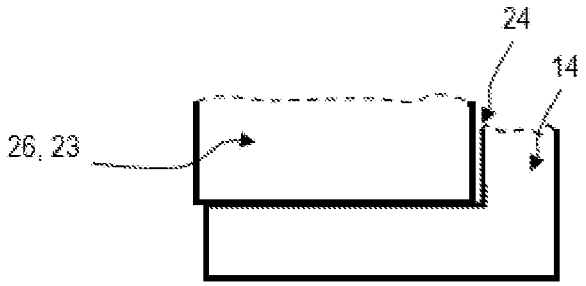
FIG. 3 (prior art)
Figure 4:
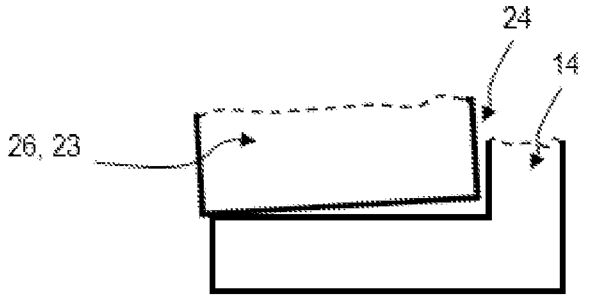
FIG. 4 (prior art)

FIGS. 2-4 show different states of relative orientations of a guiding projection 23 of one of the brake pads and a guiding groove 24 formed in the brake pad carrier 14 during different stages of a braking operation. These figures are highly schematic and only part of the guiding projection 23 and brake pad carrier 14 are depicted (as indicated by dashed lines). The guiding projection 23 is mirror symmetric with respect to a plane of symmetry S, so as to have a rectangular shape. This is more clearly visible from the below FIGS. 10-13 showing a guiding projection 23 in full. Similarly, the recess 24 actually has a rectangular outline that is open to one side for receiving the guiding projection 23. This is also more clearly visible from the below FIGS. 10-13.

For the purpose of illustration, the pad spring 25 is not shown in FIGS. 2-4 but may be provided in between and separate the brake pad carrier 14 and guiding projection 23.

FIG. 2 illustrates a state in which the brake is not active and the brake pad 26 is not actively displaced by a brake piston provided in the receiving section 15. Thus, there may be a significant clearance between the guiding projection 23 and brake pad carrier 14 that e.g. accommodates the non-illustrated the pad spring 25.

FIG. 3 illustrates a state in which the brake pad 26 is pressed by the brake piston against the brake disc 16. In this case, the clearance between the guiding projection 23 and the brake pad carrier 14 is at least locally reduced. In particular, these members are forced towards one another in at least one defined direction. Accordingly, the non-depicted pad spring 25 is clamped in between these members 23, 14 in substantially one defined area.

FIG. 4 shows a state in which the brake force is released. The guiding projection 23 may thus abruptly change its orientation due to the released tension. Therefore, undefined contacts to surrounding surfaces (e.g. of the non-illustrated pad spring 25) and/or undefined areas of compression of the pad spring 25 may occur. This may result in flutter vibrations discussed above.

Figure 5:
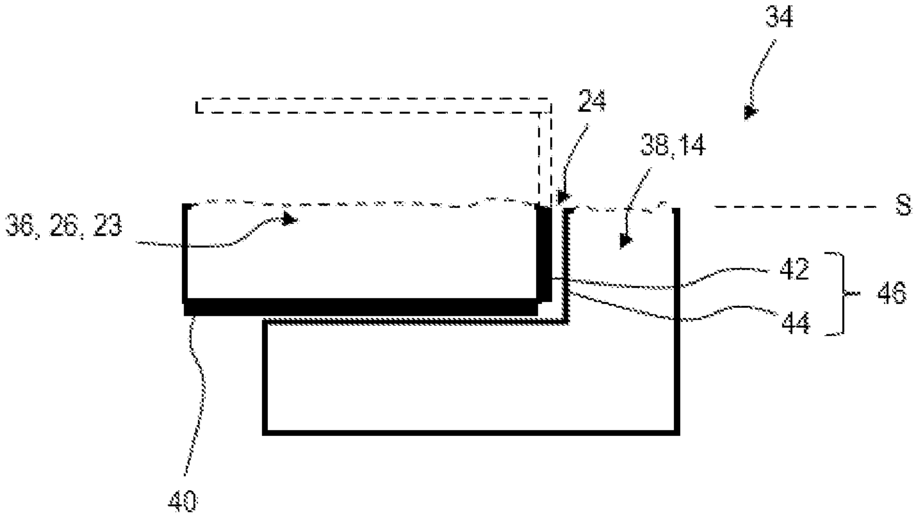
FIG. 5 shows a brake component assembly according to a first embodiment.
Figure 6:
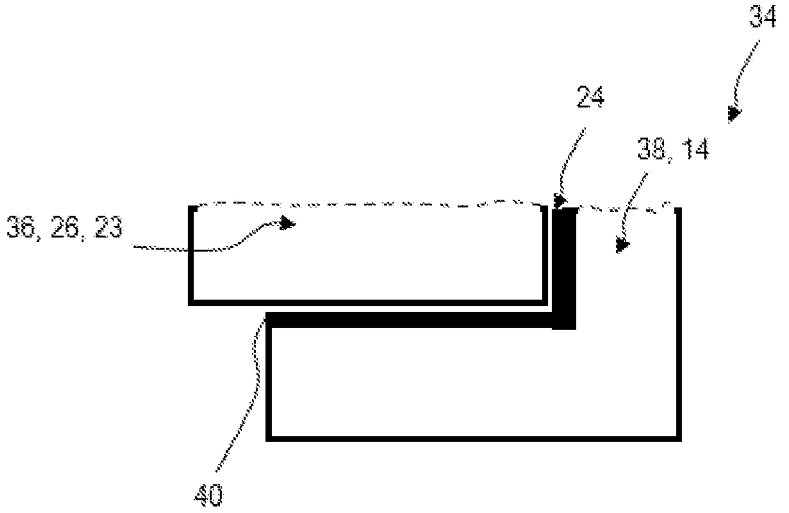
FIG. 6 shows a brake component assembly according to a second embodiment.
Figure 7:
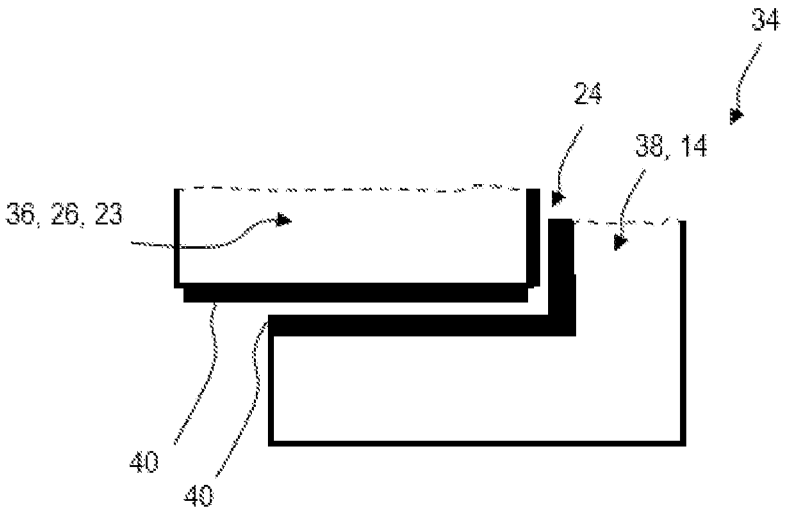
FIG. 7 shows a brake component assembly according to a third embodiment.

FIGS. 5-7 show embodiments of a brake component assembly 34 according to embodiments of this disclosure. The brake component assembly 34 may generally be provided in a wheel brake assembly 10 similar to FIG. 1, but with the additional specifics according to the presently disclosed invention as discussed in the following. Again, a pad spring 25 as in FIG. 1 may optionally be provided, but is not illustrated in FIG. 5.

The brake component assembly 34 comprises as a first component 36 the brake pad 26 and as a second component 38 of the brake pad carrier 14 and especially a guiding projection 23 comprised thereby. Similar to FIGS. 2-4, only parts of these components are shown. A plane of symmetry S is indicated, similar to FIG. 2.

FIG. 5 shows that the brake component assembly 34 also comprises a self-lubricating material 40. This self-lubricating material 40 may be configured according to any of the examples disclosed herein, in particular as a self-lubricating elastomer, such as a silicone material. The self-lubricating material 40 is provided in form of a coating. This coating is applied to outer surfaces of the guiding projection 23 which face surfaces of the guiding recess 24. An extension of the coating (i.e. of the self-lubricating material 40) beyond the plane of symmetry is illustrated by dashed lines in FIG. 5.

Accordingly, the self-lubricating material 40 comprises a first surface 42 that is configured to contact a second surface 44 comprised by the guiding recess 24, the first surface 42 and the second surface 44 forming a pair of surfaces 46 that may contact one another. Another respective pair of surfaces 46 may be formed by the (in FIG. 5) upper and lower horizontal surfaces of the self-lubricating material 40 and a respectively opposite surface of the guiding recess 24. In these cases, however, no dedicated reference signs are included in FIG. 5.

The self-lubricating material 40 is elastically deformable by contact forces occurring during normal brake operation, e.g. during normal brake activation or brake release. In particular, the self-lubricating material 40 may be elastically deformable under the weight of any of the components 36, 38 of the brake component assembly 34. For example, the elastic deformation during brake operation may include a compressibility in at least one dimension of the self-lubricating material 40 (e.g. a thickness dimension) of at least 5%.

By coating those surfaces of the guiding projection 23 that may potentially contact the guiding recess 24 (or a non-illustrated optional pad spring 25) with the self-lubricating material 40, contact forces between these members may at least partially be dampened by an elastic deformation of the self-lubricating material 40. Also, these surfaces are self-lubricated to limit friction and thereby uncontrolled relative movements of the components 36, 38. As a result, the elastic deformation in combination with the self-lubrication help to limit vibrations and acoustic noises, especially during the above-discussed releasing stage according to FIG. 4.

FIG. 6 illustrates another embodiment in which, contrary to the embodiment of FIG. 5, the self-lubricating material 40 is provided at the guiding recess 24. Specifically, it is provided at all surfaces of said guiding recess 24 that may potentially contact the guiding projection 23. This provides similar effect as in case of FIG. 5.

FIG. 7 illustrates another embodiment in which the embodiments of FIGS. 5 and 6 are combined. Specifically, in this case outer surfaces of both the guiding projection 23 and guiding recess 24 are coated with the self-lubricating material 40.

It is to be noted that the present disclosure is not limited to the brake component assembly 34 comprising the specific first and second components 36, 38 of FIGS. 5 to 7. Any other component combinations as disclosed herein may be provided. In these other component combinations, any or both of the components 36, 38 may equally be coated with a self-lubricating material 40.

Further, in case of FIGS. 5-7, the surfaces 42, 44 of the pair of surfaces 46 that contact and move relative to one another are directly comprised by the first and second components 36, 38.

FIGS. 8 to 13 contain further embodiments according to this disclosure in which, additionally or alternatively to the embodiments of FIGS. 5 to 7, the self-lubricating material 36 is comprised by a separate member. This separate member is a clip 48 that is arrangeable in between the first and second components 36, 38 of a brake component assembly 34. Specifically, this clip 48 is fixed to one of the components 36, 38 of a brake component assembly 10. It may comprise at least one surface 42, 44 of a pair of surfaces 46 that are movable relative to one another when activating or releasing the brake, similar to the pair of surfaces 46 in FIG. 5.

Figure 8:
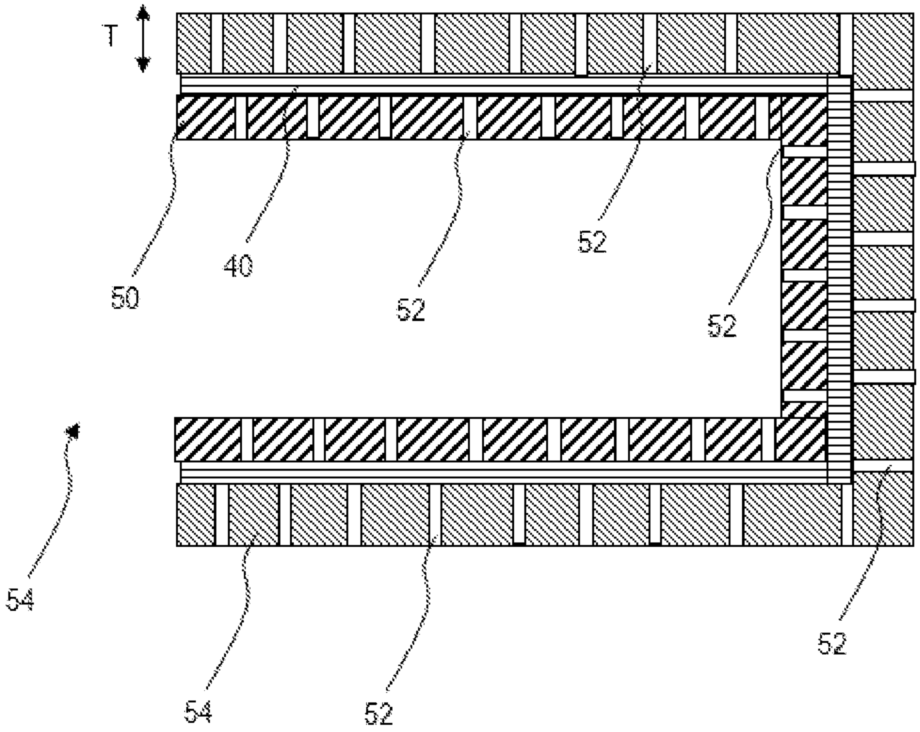
FIG. 8 shows a clip for a brake component assembly according to a fourth embodiment.
Figure 9:
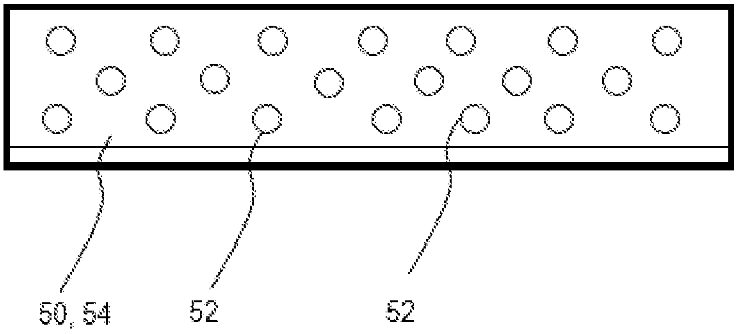
FIG. 9 shows part of an outer surface of a perforated member of the clip according to FIG. 8.
Figure 10:
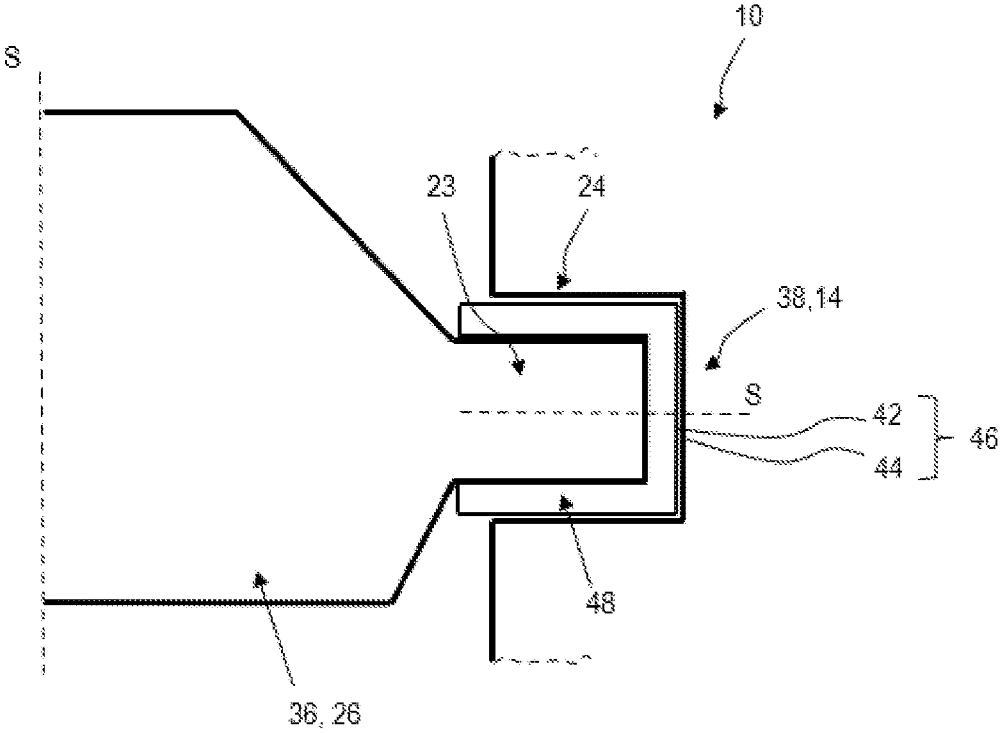
FIG. 10 shows a brake component assembly comprising a clip according to a fifth embodiment.

In FIG. 8, a cross-section through a clip 48 as e.g. comprised by a brake component assembly 10 of FIG. 10 is shown. The clip 48 has a C-shape with the depicted orientation resembling a reversed or mirrored orientation of said C-shape. The clip 48 comprises an inner perforated member 50 and an outer perforated member 54 that are each shaped according to the C-shaped. The inner and outer perforated members 50, 54 are both made of a rigid metallic material. They each comprise a number of through-holes 52 forming the perforations and extending through or across the respective thicknesses or, put differently, material strengths. Not all of the through-holes 52 are marked with an own reference sign in FIGS. 8 and 9. The through-holes 52 open towards outer external surfaces (see outer perforated member 54 in FIG. 8) and inner external surfaces (see inner perforated member 50 in FIG. 8).

A layer of self-lubricating material 40 is arranged in between and is thus sandwiched between the perforated members 50, 54. A lubricant that is exuded by said self-lubricating material 40 can thus be released through the through holes 52 towards the respective inner and outer external surfaces of the clip 48. This may e.g. occur when the self-lubricating material 40 is exposed to mechanical pressure and/or may occur steadily over time.

Merely as an example, the outer perforated member 54 may be thicker (i.e. have a larger material strength) than the inner perforated member 50.

Alternatively, these members may have a substantially similar thickness. A thickness of the self-lubricating material 40 may be lower than a thickness of any of the inner and outer perforated members 50, 54. For example, the outer perforated member 54 may have a thickness of 0.3 mm to 0.5 mm and/or the inner perforated member 50 may have a thickness of 0.2 mm to 0.3 mm. The layer of self-lubricating material 40 may have a thickness of 0.1 to 0.2 mm. Generally, any of the inner perforated member 50, outer perforated member 54 and self-lubricating material 40 may have a thickness of less than 1 mm and e.g. not more than 0.5 mm. A thickness dimension T is marked for the outer perforated member 54 in FIG. 8 and is correspondingly oriented for the inner perforated member 50 and self-lubricating material 40.

Due to being arranged in between the perforated members 50, 54, the self-lubricating material 40 provides an elastic deformability of the overall clip 48. Specifically, the self-lubricating material 40 acts as an elastically deformable spacer that is arranged in between the perforated members 50, 54.

FIG. 9 is a frontal view of an externally facing surface section of any of the perforated members 50, 54. In this Figure, the openings of the through holes 52 face the viewer. Again, only some of said through holes 52 are provided with an own reference sign.

FIG. 10 illustrates and arrangement of the clip 48 of FIG. 8 within a brake component assembly 10 according to an embodiment of this disclosure. The clip 48 is schematically illustrated and does not show all details of the cross-section of FIG. 8.

The brake component assembly 10 of FIG. 10 again comprises a first component 36 in form of a brake pad 26 and a second component 38 in form of a brake pad carrier 14. The clip 48 is held at and is jointly movable with the brake pad 26, but could alternatively be held at the brake pad carrier 14.

It may be beneficial to provide self-lubrication in between the clip 48 and the respective one of the brake pad 26 and brake pad carrier 14 at which the clip 48 is held. This is because small relative movements and in particular vibrations may still occur between these members. In the shown example, the clip 48 is connected to the brake pad 26 by a force fit resulting from an elastic deformation when pushing the clip 48 onto the guiding projection 23.

In FIG. 10, a pair of surfaces 46 that are movable relative to one another by a substantial distance of several millimetres or centimetres when operating the vehicle wheel brake 11 comprise: a first surface 42 which is in outer surface of the clip 48 and a second surface 44 which is an inner surface of the guiding recess 42. These surfaces 42, 44 are lubricated by way of the self-lubricating material 40 of FIG. 8. This material releases a lubricant that reaches an outer surface of the outer perforated member 54 of FIG. 8.

For the sake of completeness, FIG. 10 shows a position of a horizontal plane of symmetry S mentioned earlier in connection with FIG. 5. Also, another vertical plane of symmetry S is shown and the brake pad 26 is mirror-symmetric with respect to this vertical plane of symmetry S. Accordingly, a second non-illustrated guiding projection 23 is provided comprising a similar clip 48.

Figure 11:
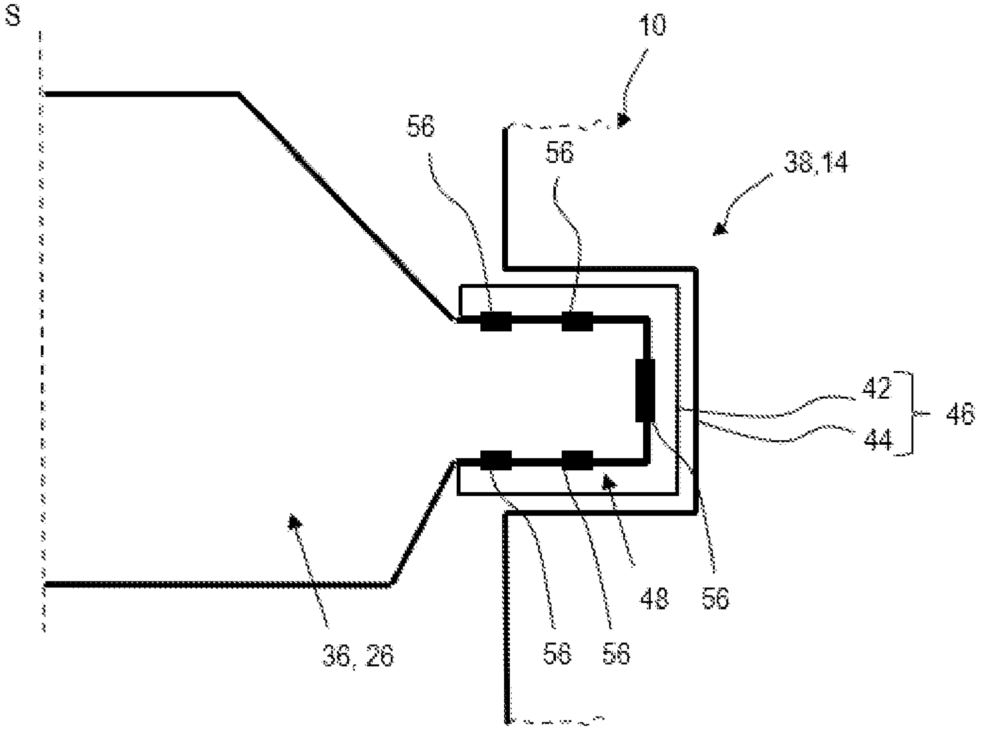
FIG. 11 shows a brake component assembly comprising a clip according to a sixth embodiment.

FIG. 11 is a development of the embodiment of FIG. 10 and additionally indicates positions of fixing the clip 48 to the guiding projection 23 by locally deposited volumes of adhesive 56. In this case, the clip 48 may be configured according to FIG. 8 or may only comprise the outer perforated member 54 of FIG. 8, but not the inner perforated member 50.

Figure 12:
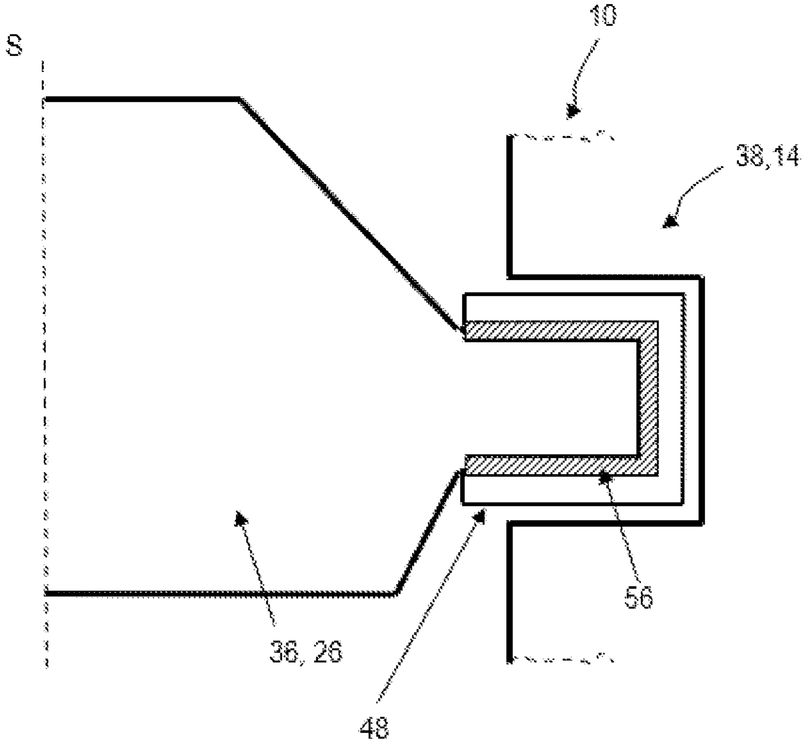
FIG. 12 shows a brake component assembly comprising a clip according to a seventh embodiment.

FIG. 12 shows another example similar to FIG. 11, but with the adhesive 56 being provided as a larger and preferably continuous layer. Specifically, an inner surface of the clip 48 can be largely or even fully coated with the adhesive 56 to be secured at the guiding projection 23. Again, in this case the inner perforated member 50 of FIG. 8 may be omitted.

Figure 13:
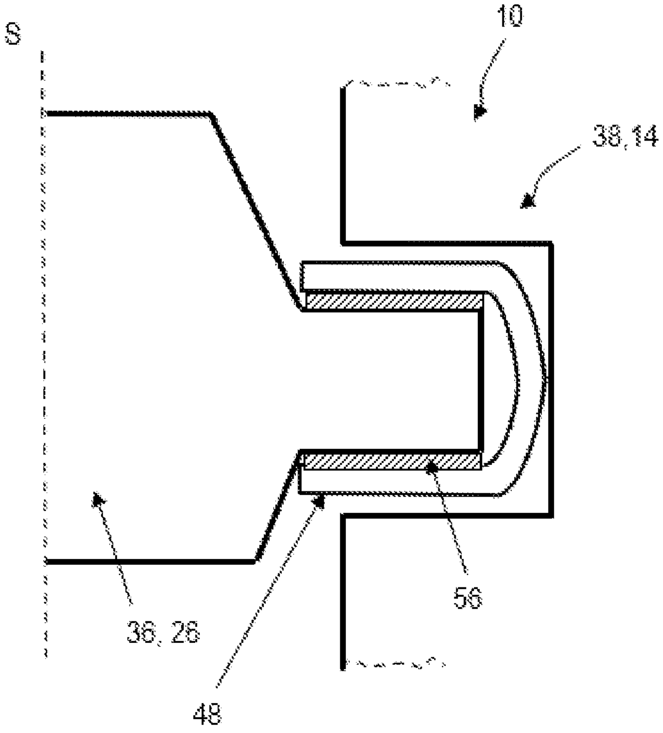
FIG. 13 shows a brake component assembly comprising a clip according to an eighth embodiment.

FIG. 13 as a configuration similar to FIG. 12 but with the clip 48 having a slightly different form. Specifically, instead of the C-shape of FIG. 12 having sharp edges and thus resembling a rectangular shape with one open side, the clip 48 has a more rounded C-shape. Optionally, its rounded section may be arranged at a distance to a respectively adjacent surface of the guiding projection 23. Thus, the rounded section may provide a spring-like deformable section. A direction of deformability may extend in a (in FIG. 13 horizontal) direction extending orthogonally to the depicted vertical plane of symmetry S. Again, the clip 48 may have no inner perforated member 50 as depicted in FIG. 8.

It is noted that a clip 48 as shown throughout the FIGS. 8 to 13 can be provided instead of a known pad spring 25 according to the prior art solution of FIG. 1. Specifically, the clip 48 may comprise a non-illustrated elastically deformable portion similar to known pad springs 25 to provide a restoring effect (i.e. for moving the brake pad 26 reliably into its inactive position when releasing the brake).

It is also noted that the use of perforated members 50, 54 of e.g. FIG. 8 is not limited to the embodiment comprising a clip 48. Rather, a perforated member 50, 54 at which a layer of self-lubricating material 40 is provided can also be used to replace known shims at back plate of a brake pad 26. Also, perforated members 50, 54 may be used in between any types of first and second components 36, 38 disclosed herein, wherein said types may be different from a brake pad 26 and brake pad carrier 14.

What is claimed is:

1. Brake component assembly for a vehicle wheel brake, comprising a first component and a second component, wherein the first and second component are movable relative to one another when engaging and releasing the vehicle wheel brake, wherein a self-lubricating material is provided that is configured to lubricate at least one pair of surfaces that contact one another and that are movable relative to one another when moving the first and second component relative to one another, wherein the self-lubricating material is elastically deformable, wherein the self-lubricating material is configured to elastically deform so as to dampen contact forces and reduce vibration and noise while lubricating the contacting surfaces.

2. Brake component assembly according to claim 1, wherein the self-lubricating material is comprised by a coating arranged at at least one of the surfaces of the pair of surfaces.

3. Brake component assembly according to claim 1, wherein the self-lubricating material is comprised by at least one clip that comprises one of the surfaces of the pair of surfaces and that is held at one of the first component and second component.

4. Brake component assembly according to claim 3, wherein one of the first component and second component is a brake pad and the clip is arranged at the brake pad and is jointly displaceable therewith.

5. Brake component assembly according to claim 3, wherein one of the first component and second component is a brake pad carrier and the clip is arranged at the brake pad carrier.

6. Brake component assembly according to claim 1, wherein the self-lubricating material is provided at both of the surfaces of the pair of surfaces.

7. Brake component assembly according to claim 1, wherein the self-lubricating material is arranged at at least one perforated member that is stiffer than the self-lubricating material, the perforated member comprising or contacting at least one of the surfaces of the pair of surfaces.

8. Brake component assembly according to claim 3, wherein the clip comprises the perforated member and the perforated member comprises a plastic material or a metal material.

9. Brake component assembly according to claim 7, wherein the self-lubricating material is arranged in between a first perforated member and a second perforated member.

10. Brake component assembly according to claim 1, wherein the first component is a brake piston and the second component is a backplate of a brake pad.

11. Brake component assembly according to claim 1, wherein the first component is a finger portion of a brake caliper housing and the second component is a back plate of a brake pad.

12. Brake component assembly according to claim 1, wherein the first component is a guide pin and the second component is a brake pad carrier.

* * * * *